Oct. 12, 1965 J. P. BRULE ETAL 3,211,976
DIGITAL SERVO SYSTEM
Filed Nov. 12, 1957 7 Sheets-Sheet 1
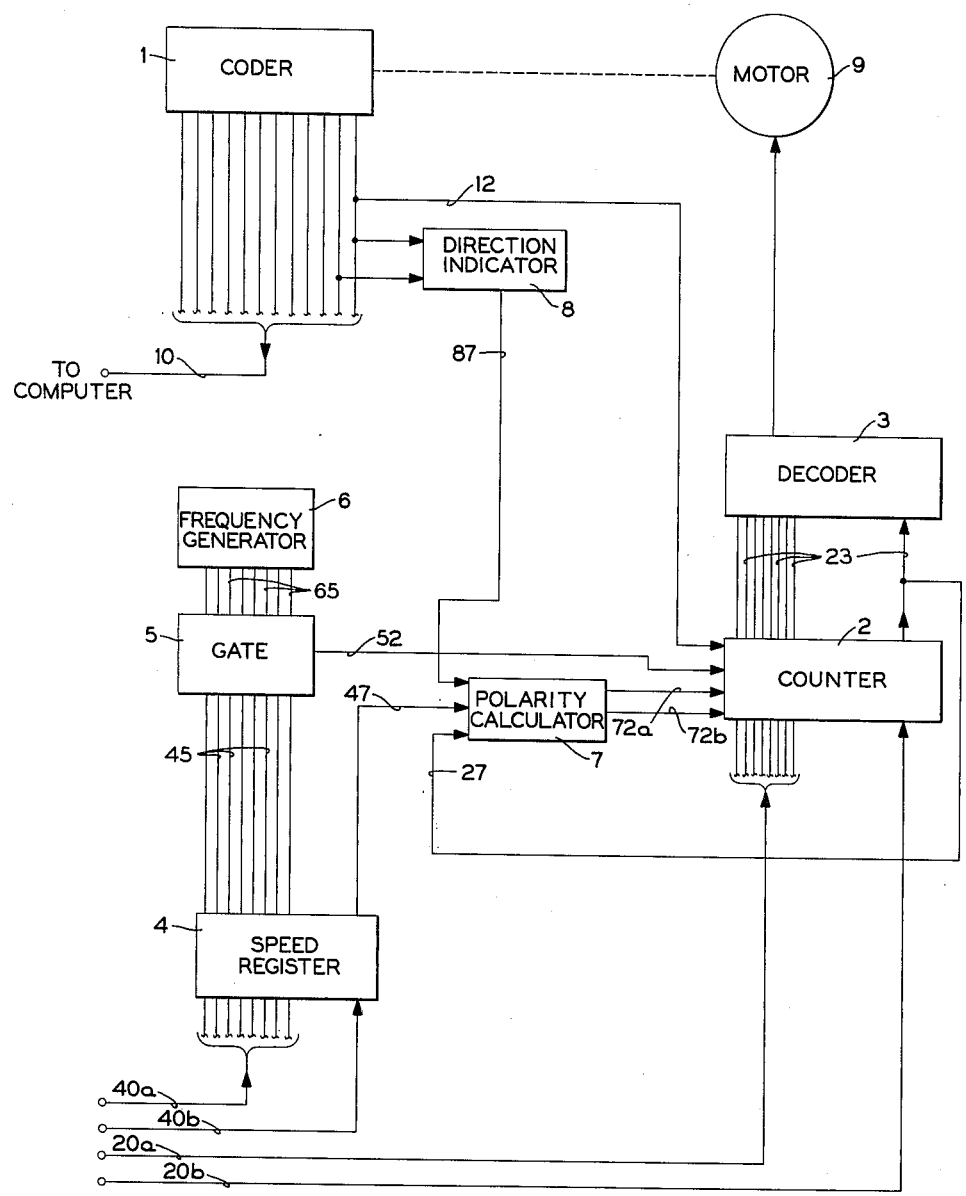
FIG_ 1
INVENTORS
JEAN P. BRULE
JEAN M. JACQUET
BY
Dewey J. Cunningham
ATTORNEY Oct. 12, 1965  J. P. BRULE ETAL  3,211,976
DIGITAL SERVO SYSTEM
Filed Nov. 12, 1957  7 Sheets-Sheet 2
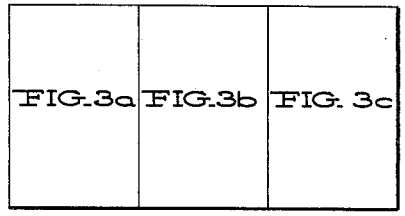
FIG_2
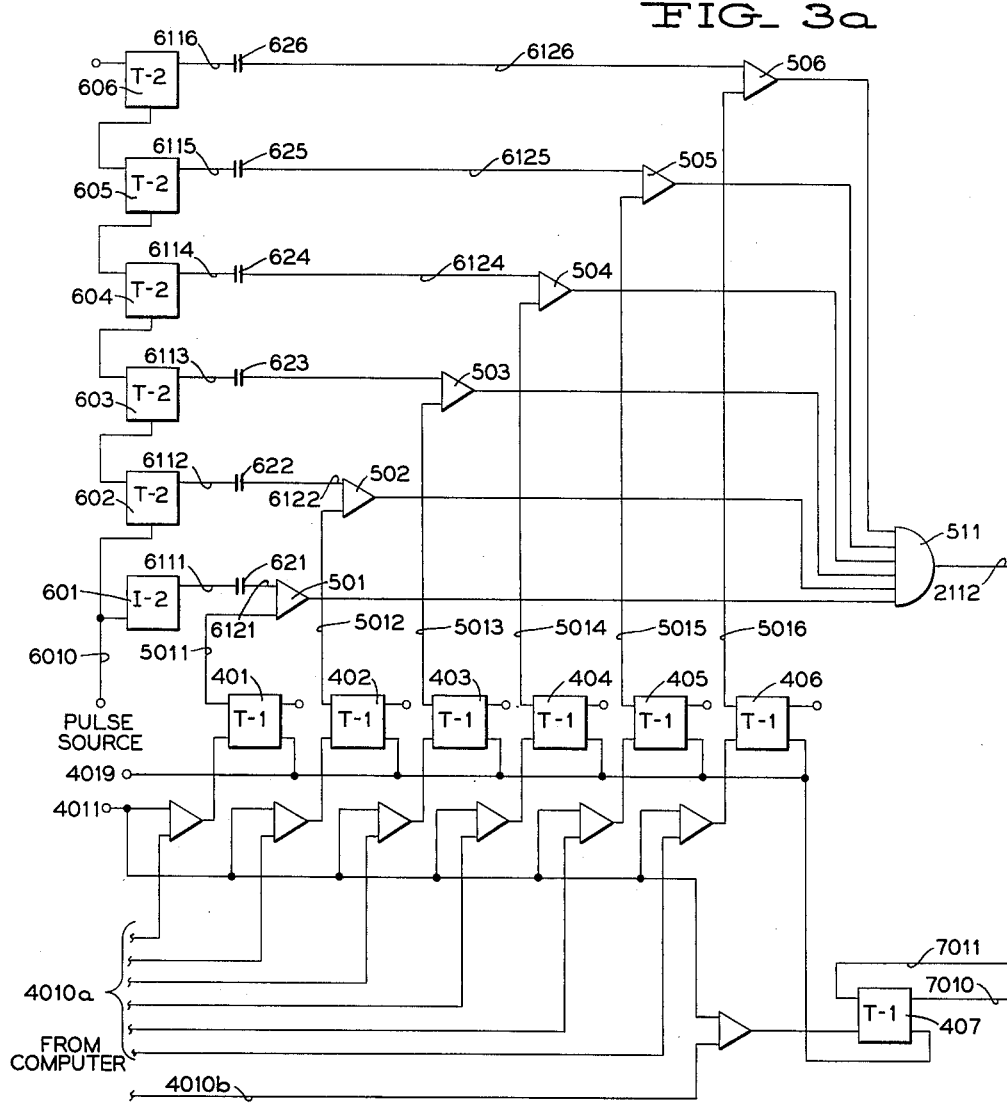
FIG_3a

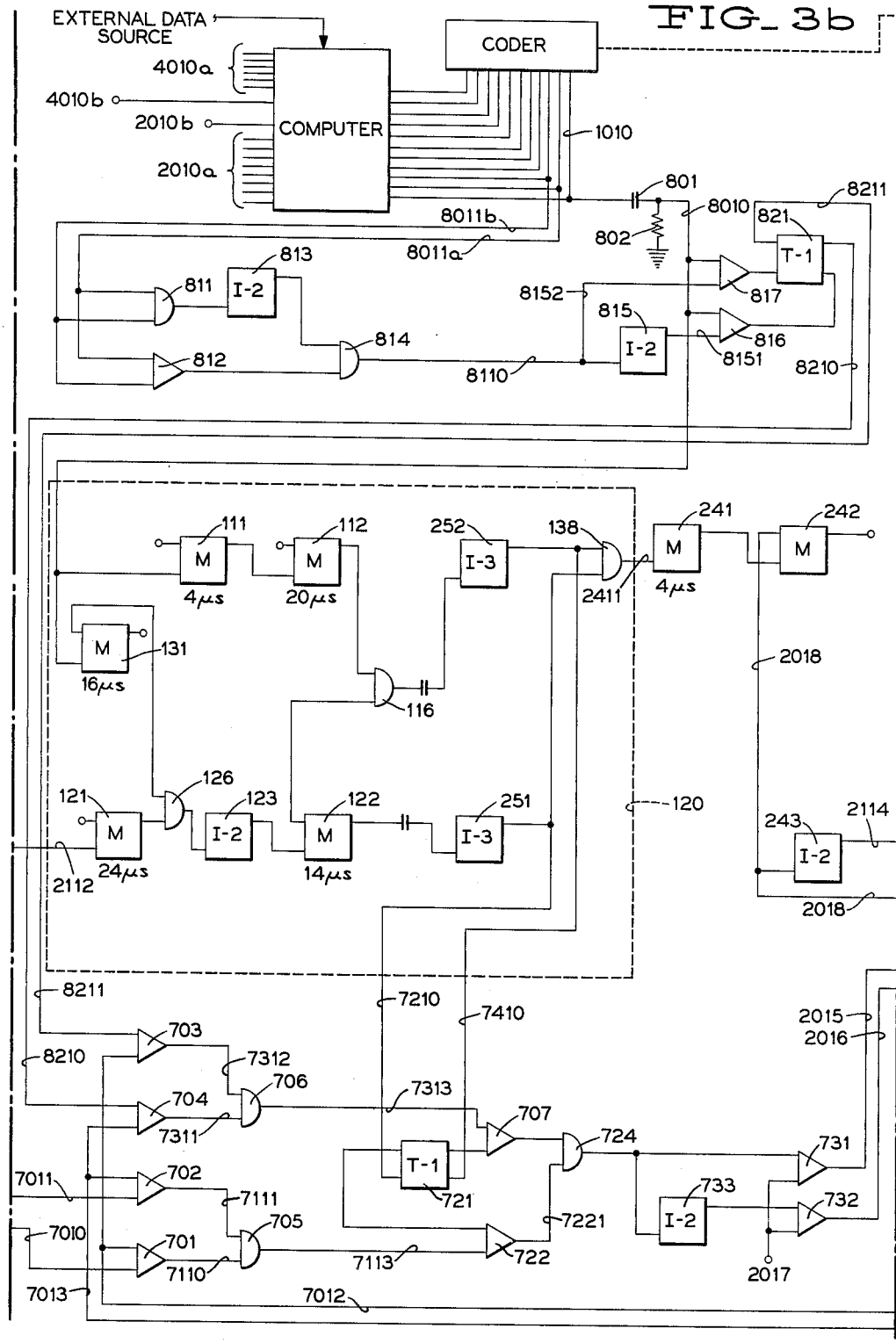

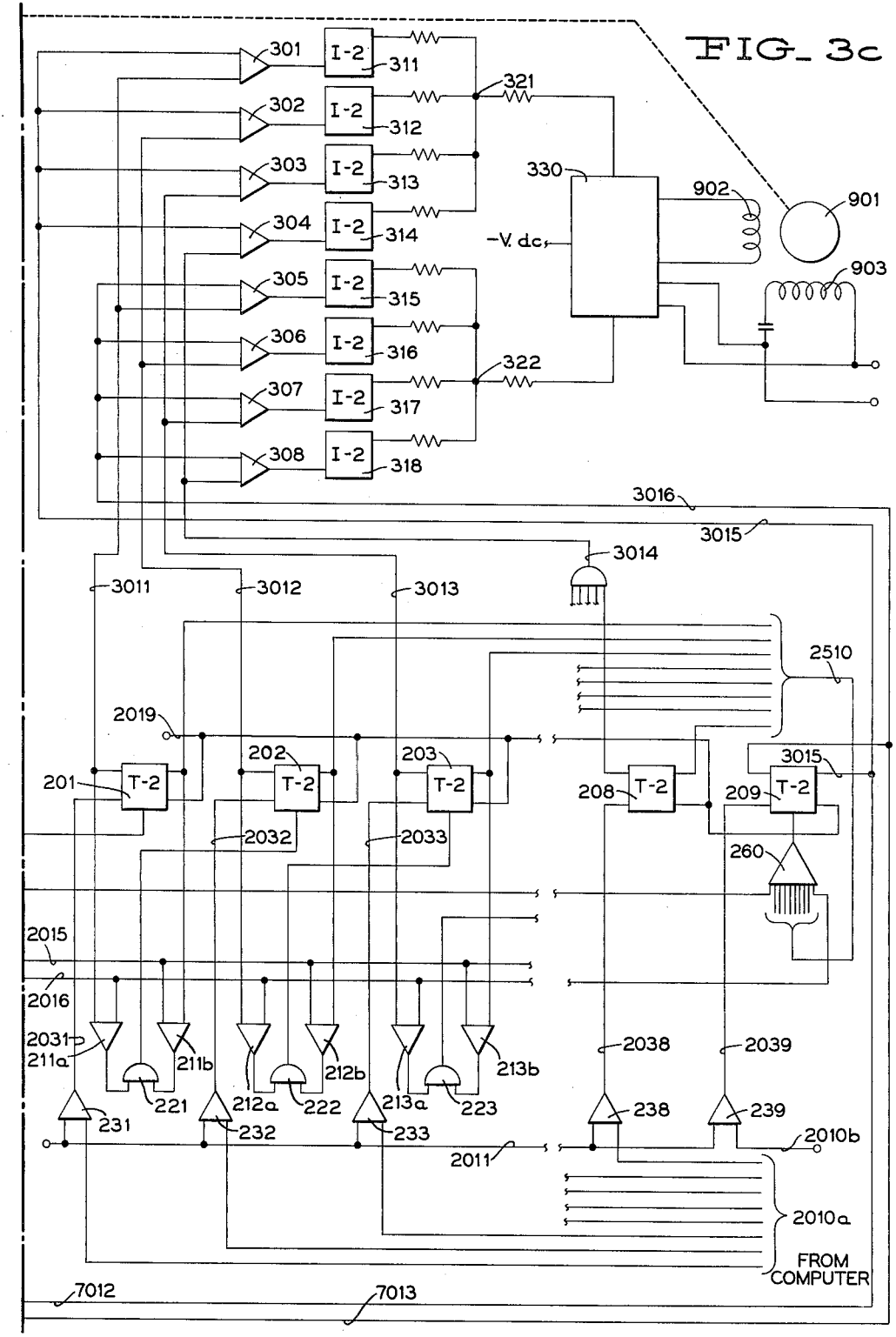

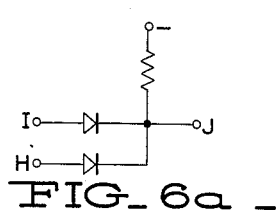
FIG_6a
FIG_6b
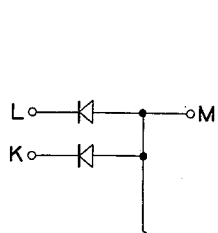
FIG_7a
FIG_7b
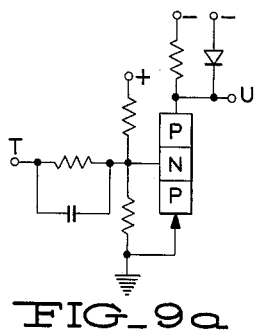
FIG_9a
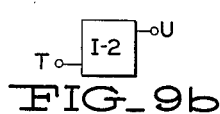
FIG_9b
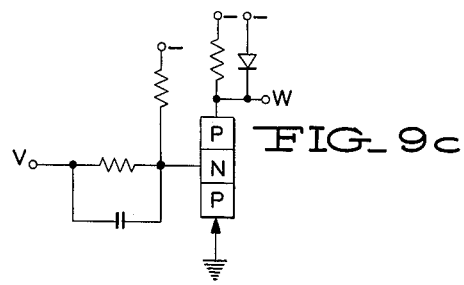
FIG_9c
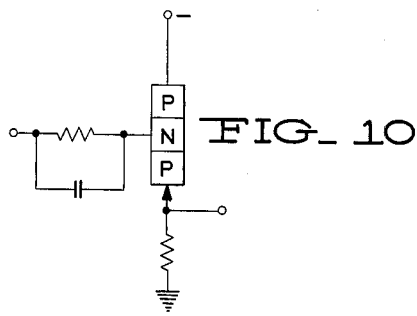
FIG_10
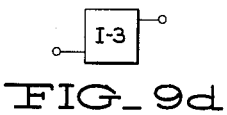
FIG_9d
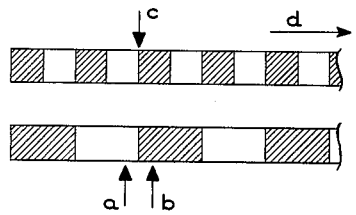
FIG_12a
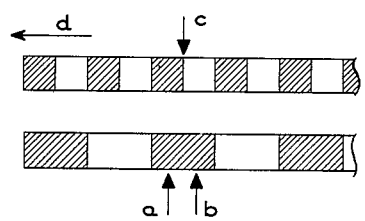
FIG_12b

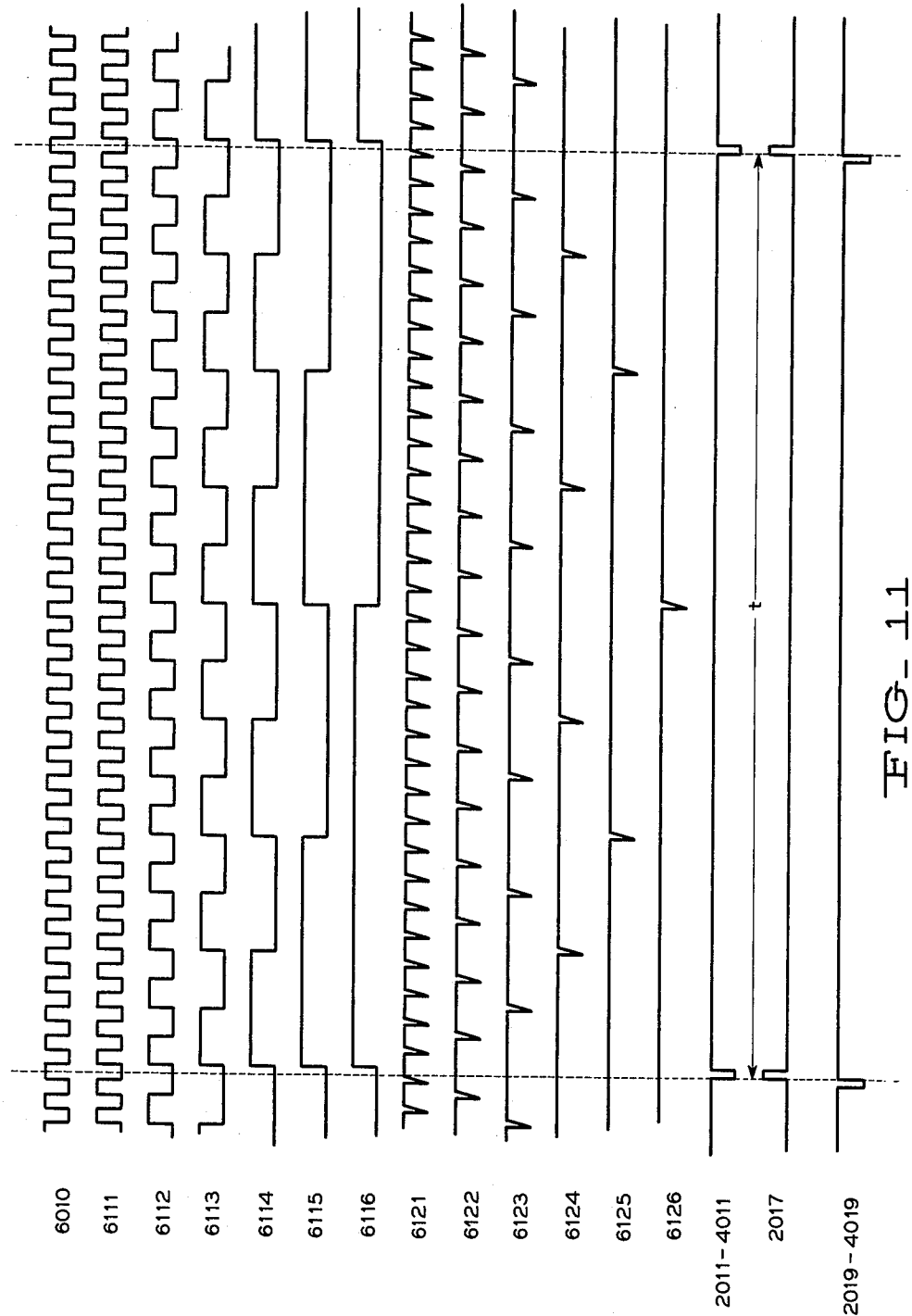

United States Patent Office

3,211,976
Patented Oct. 12, 1965

3,211,976
DIGITAL SERVO SYSTEM
Jean Pierre Brule, Saint-Mande, and Jean Marc Jacquet, Bretigny-sur-Orge, France, assignors to Compagnie IBM France, Paris, France
Filed Nov. 12, 1957, Ser. No. 695,575
Claims priority, application France, Nov. 13, 1956, 725,577
14 Claims. (Cl. 318—28)

This invention relates to a control system and particularly to an arrangement of devices for setting up a certain relationship between a revolving shaft and an external information.

In problems involving the control of a rotating shaft, it is necessary to locate at any moment the relative position of that shaft and consequentially control the motor which rotates said shaft in order to correct its located position, so that it may be placed in the position defined by the external information. With this location reading and control being performed on continuous phenomena, they may be expressed in continuous magnitudes, the one as a function of the shaft position, the other liable to be transformed into a control voltage of the motor, for example. But the comparison of these continuous magnitudes with the external information in devices for performing this comparison does not concede a great precision. If control precision is to be improved, it is necessary to use a digital computer. Generally speaking, the use of a digital computer has the inconvenience of achieving the control in a discontinuous way, because such a computer has a computation period during which it can neither use a new information nor deliver orders.

The main object of this invention is to furnish a new and improved control system for achieving the control of a rotary shaft in a continuous way although a digital computer is used. According to this invention, the computer receives, at the beginning of each calculation cycle of duration $t$, an information associated with the relative angular position $\alpha$ of the shaft to be controlled, and compares it with the information data from external sources so as to provide the motor control device with a correction $\Delta\alpha$ to be applied to shaft position, which correction is continuously modified in accordance with the trend of the information data.

Another object of this invention is to provide a device for controlling a rotary shaft in a continuous way through the provision of a control organ for the motor enabling to modify $\Delta\alpha$ continuously in terms of the probable value of $\alpha$'s variation during the cycle, which value is calculated by the computer so as to obtain at every cycle a value of $\Delta\alpha$ as low as possible. As a result, the computer is widely independent of the servo-mechanism.

Another object of this invention is to furnish a device in which the control of a rotary shaft is permanently operated independently of the computer, there being a shaft position coder which directs into the control device shaft information data enabling to check the servo-control.

Another object of this invention consists in providing a rotary shaft servo-mechanism which realizes this control by using the difference between the actual position of this shaft and the theoretical one, instead of the very positions, which increases the precision of the control without increasing the number of organs.

Another object of this invention consists of a new rotary shaft servo-mechanism in which the shaft depends on the action of an organ which receives information data giving the variation of the rotary shaft position, and data coming from the digital computer at predetermined times which take into account the probable position variation of the rotary shaft during a calculation cycle.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 shows a block diagram of a servo-mechanism in conformity with the invention;

FIG. 2 represents a mode of assembling FIGS. 3a, 3b and 3c giving the diagram of a servo-mechanism in conformity with the invention;

FIGS. 3a, 3b, 3c show a block diagram of a servo-mechanism in conformity with this invention;

Figure 4A:
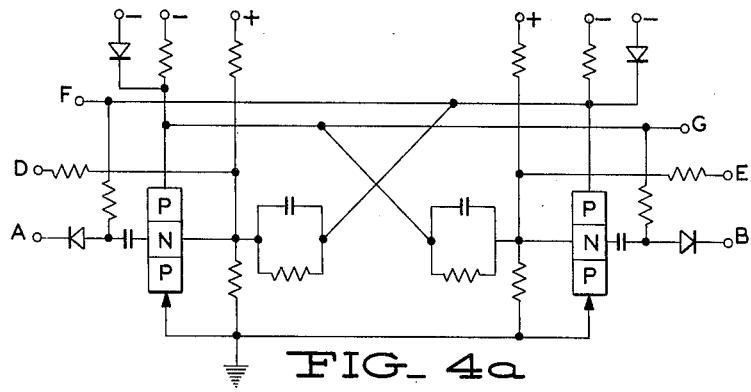
Figure 4B:
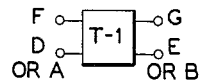
Figure 5A:
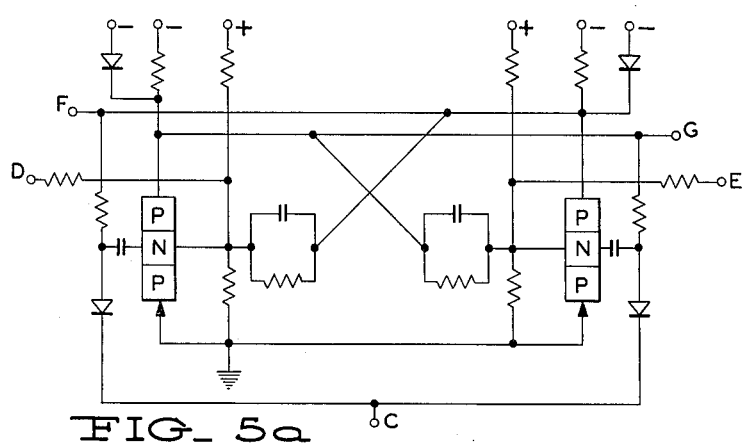
Figure 5B:
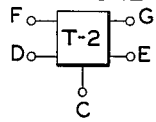
Figure 8A:
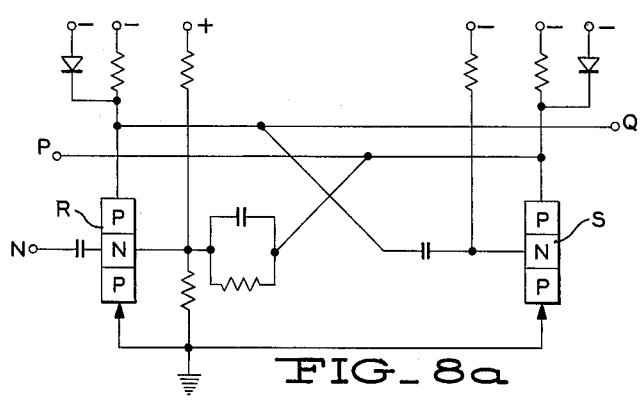
Figure 8B:
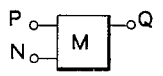

FIGS. 4a and 4b respectively show the diagram of a trigger of the T–1 type and its symbolic representation used in the block diagram;

FIGS. 5a and 5b respectively represent the diagram of a binary input trigger of the T–2 type and its symbolic representation used in the block diagram;

FIGS. 6a and 6b respectively show the diagram of a logical AND circuit and its symbolic representation used in the block diagram;

FIGS. 7a and 7b respectively show the diagram of a logical OR circuit and its symbolic representation used in the block diagram;

FIGS. 8a and 8b respectively show the diagram of a monostable circuit and its symbolic representation used in the block diagram;

FIG. 9a shows an inverter of the type I–2 illustrated in block form in FIG. 9b, while FIG. 9c shows an inverter of the type I–3 illustrated in block form in FIG. 9d;

FIG. 10 shows the diagram of a transistorized amplifier of the emitter-follower type;

FIG. 11 shows in a diagram the relative positions in time of the pulses at certain points of the block diagram; and FIGS. 12a and 12b show the use of the coder for determining its rotary direction.

Referring to FIG. 1, the present invention may be briefly described as comprising a motor 9, the shaft of which must be controlled by its motion, said motor being directed by a binary counter 2 where indications are transformed into a control element of the motor through a digital-to-analog converter or decoder 3. On the motor shaft is mounted a coder 1 which gives at any moment, in the binary numeration system, for example, the value of angle $\alpha$ at which the coder is positioned. At the beginning of each calculation cycle, a computer (not shown) receives, through a bundle of wires 10, the indication of the value of $\alpha$ at that time. The computer compares it with a computed shaft position $\alpha_c$, the value $\alpha_c$ being derived from information supplied to the computer by sources external to the device. Then, the computer delivers immediately an information relating to correction $\Delta\alpha$ to be given to the position of the shaft, which information is transmitted to counter 2 by a bundle of lines 20a and it transmits, besides, to counter 2, through line 20b, an information which defines if the shaft to be controlled is behind its theoretical or computed position, or ahead of it.

On the other hand, the computer which must be used in connection with the device is a memory computer which keeps $\alpha_c$ values corresponding to the beginning of previous calculation cycles; therefore it may provide at the same time as $\Delta\alpha$, a value $d\alpha$ obtained by extrapolating the variation of $\alpha_c$ over a number of calculation cycles, and delivers through line bundle 40a this value $d\alpha$ to a speed register 4 and through wire 40$b$, the sign of $d\alpha$ to the same speed register. A circuit 5 receives from speed register 4 through wire bundle 45 value $d\alpha$, and through bundle 65 pulses of a defined frequency developed by a frequency generator 6. This circuit directs into counter 2, through line 52, a number of pulses equal to the value of $d\alpha$. Counter 2 must, according to the case, either add together $d\alpha$ and $\Delta\alpha$, or subtract $d\alpha$ from $\Delta\alpha$. As a matter of fact, if $\Delta\alpha$ and $d\alpha$ are positive, the shaft to be controlled is behind its theoretical position, the correction must advance it and, during the cycle with $d\alpha$ positive, the shaft also must progress during that cycle, and consequently both indications have to be added together. So it is, if $\Delta\alpha$ and $d\alpha$ are negative, except that the shaft is advanced in the opposite direction. On the other hand, if $\Delta\alpha$ and $d\alpha$ are of contrary signs, correction and advance during the cycle have different directions and $d\alpha$ must be subtracted from $\Delta\alpha$. Polarity calculation circuit 7 receives through lines 27 and 47 the indications relating to the respective signs of $\Delta\alpha$ and $d\alpha$ and directs into counter 2 through line 72$b$ an indication which enables the counter to know if pulses from line 52 must increase or decrease the value entered in the counter through the initial transfer of the value of $\Delta\alpha$. Decoder 3 then transforms the value entered in counter 2, which value is delivered thereto through line bundle 23, into a voltage control of the motor, as a function of this value. On the other hand, the motor in rotation drives coder 1 which sends a pulse to counter 2 through line 12 every time the value of angle $\alpha$ changes by one unit, which pulses enable to correct at any time the value entered in counter 2. Therefore, every pulse must decrease this value by one unit. It might be that, due to the delay in motor response to control voltages, the motor keeps on rotating while the value entered in the counter is null and at that time, pulses from line 12 must increase that value. For this purpose, the polarity calculation circuit compares the sign of the value entered in counter 2 with an indication from a circuit 8 through line 87 which indicates the rotary direction of the motor. If these indications correspond to each other, that is, positive entered value and progressing coder, or negative entered value and receding coder, an information is transmitted through line 72$a$ in order to decrease the value entered when every pulse arrives in line 12. If the motor overshoots its position, the sign of the value entered in counter 2 changes, but the rotary direction of the coder does not change and the information sent through line 72$a$ enables to increase at that time the value entered in the counter at the arrival of each pulse.

The various constituent elements of the circuit shown in FIGS. 3$a$ through 3$c$ are typical conventional logical circuit such as triggers, inverters, AND circuits, OR circuits, monostable circuits and inverter circuits. These various circuits are shown in FIGS. 4, 5, 6, 7, 8 and 9, and will be described briefly before the overall invention is explained.

The trigger shown in FIG. 4$a$ is a bistable circuit using two transistors. In each stable state, one of the two transistors conducts while the other is cut off, and subsequently the output terminal either F or G, connected to the collector of the conducting transistor, is at ground potential, whereas that terminal which is connected to the collector of the blocked transistor is at the negative potential of the source which is connected to the collector through a clamping diode. The development of a negative potential at that of input terminals A or B which is associated with the base of the blocked transistor, or the arrival of a negative pulse at that of terminals D or E which is associated with the base of the blocked transistor, changes the stable state of the trigger circuit in a well known manner, and the potentials of output terminals F and G are changed over.

In FIG. 5$a$, a variant of the preceding circuit has been shown, where both input terminals A and B of the circuit in FIG. 4$a$ have been connected to a common input terminal C. In this trigger circuit, terminals D, E, F, G serve the same purpose as in the circuit of FIG. 4$a$. If a negative potential develops at terminal C, the diode which links terminal C with the base of the conducting transistor through a capacitor, is polarized in the reverse direction through the collector voltage of the blocked transistor and offers a high impedance, whereas the diode which links terminal C with the base of the blocked transistor offers a low impedance, and everything goes on as if connection where set up from terminal C only to the base of the blocked transistor. In other words, each negative pulse to terminal C reverses the state of the trigger.

A logical AND circuit, shown in FIG. 6$a$, is a circuit in which input terminals H and I may be either at the potential of ground, or at a negative potential. In such a circuit output terminal J is at a negative potential if both input terminals are simultaneously at a negative potential, and if not, output terminal J is at ground potential.

A logical OR circuit, shown in FIG. 7$a$, is a circuit in which input terminals K and L may be either at ground potential or at a negative potential. In such a circuit, output terminal M is at ground potential except if one at least of input terminals K or L is at a negative potential.

A monostable circuit shown in FIG. 8$a$, is a single stable state circuit in which transistor R is normally cut off whereas transistor S normally conducts. In these conditions, output terminal P is at ground potential whereas output terminal Q is at a negative potential. The coming of a negative pulse or the development of a negative potential at input terminal N, causes, in a known way, the switching, during a certain time of transistor R to conducting state and of transistor S to a cut off state, and subsequently the system comes back to its stable state. Thus, upon switching, at output terminal P, there develops a negative pulse of a certain duration and at output terminal Q a positive pulse of equal duration.

The inverter circuits used are of two types: the circuit in FIG. 9$a$ is of the type I-2 and is a circuit in which output terminal U is at ground potential when input terminal T is at a negative potential (conducting transistor), and at a negative potential when input terminal T is at ground potential (blocked transistor). The circuit of FIG. 9$c$ is an inverter circuit of the type I-3 which transforms a positive pulse arriving at input terminal V into a negative pulse at output terminal W (stable state conducting transistor) and is not affected by negative pulses.

In the diagram of FIG. 3$b$ monostable circuits are shown in the form of squares as in FIG. 8$b$. It should be understood that inverter circuits such as those shown in FIG. 9$a$ may be used in conjunction with the outputs from terminals P and Q in order to provide appropriate impedance levels. However, for logic purposes the blocks representing the monostable circuit shown in FIG. 3$b$ are still understood to produce a negative output pulse at terminal P and a positive output pulse at terminal Q in response to a negative going voltage appearing at terminal N. The duration of each of the output pulses varies in accordance with the time in microseconds indicated below each monostable circuit block.

On the other hand squares representing trigger circuits may also contain circuits for adapting impedances such as that shown in FIG. 10. This current is an amplifier of the well known emitter-follower known type. In these triggers, as previously described, the left output terminal becomes negative and the right output terminal goes to ground potential when a negative pulse reaches the left input terminal, whereas a negative pulse coming to the right input terminal makes the right output terminal negative and drives the left output terminal to ground potential.

Reference is now made to the whole device, the circuit of which is detailed in FIGS. 3a, 3b and 3c. The reversing counter shown in the lower part of FIG. 3c, essentially comprises eight triggers 201 through 208 used for entering the value Δα from the computer received through line 2010a. Triggers 201 through 208 are each reset to their binary 0 state immediately prior to the entry therein of the value Δα. That is to say, their left output terminal is at ground potential while the right output terminal is at a negative potential. The value of Δα given in the binary numeration system is shown at the output of the computer by the presence of a negative potential in one or several of the eight lines of bundle 2010a. The sign of Δα is provided by the absence of a negative potential in wire 2010b if Δα is positive and the presence of a negative potential in this wire if Δα is negative. The computed position to which it is desired the rotary shaft be positioned will be, at the beginning of each calculation cycle, successive positions $α_{c1}, α_{c2} \ldots α_{cn}$ resulting from the information supplied or produced by the computer. The actual successive positions of the shaft, identified at the beginning of each calculation cycle, are $α_1, α_2 \ldots α_n$. At the beginning of the $n^{th}$ calculation cycle, the position correction Δα is equal to $α_{cn}-α_n$.

At the beginning of the calculation cycle in the computer, a negative transfer pulse is directed into line 2011. Subsequently, those of AND circuits 231 through 238, one of the input terminals of which is connected to a line of bundle 2010a that is at a negative potential, and AND circuit 239, if wire 2010b is at a negative potential, let the transfer pulse go through, and through corresponding lines 2031 to 2039 set a binary 1 in the associated triggers 201 through 209. Assume that the binary 1 state of the triggers, is that state in which the left output terminals are at a negative potential, and the right output terminals at ground potential.

The value and sign of Δα are thus entered in the counter. The value of Δα now is transmitted to the decoder shown in the upper part of FIG. 3c. According as Δα is positive or negative, that is state 0 or 1 of trigger 209, a negative potential is present in line 3015 or 3016 and subsequently at one of the input terminals of logical AND circuits 301 through 304 or 305 through 308. On the other hand, a negative potential is present in one or several of lines 3011, 3012, 3013, 3014 if one or several of the corresponding triggers 201, 202, 203 or any one of the group of triggers 204 through 208 has been driven to state 1 by the transfer of the value of Δα. Those of the AND circuits either in group 301 through 304 or group 305 through 308, the two input terminals of which are negative, drive to a negative potential the input terminals of corresponding inverters 311 through 318, and a current, in the terms of the value of Δα is delivered by these inverters to a conventional magnetic amplifier 330 toward point 321, if Δα is positive, and 322, if Δα is negative. Magnetic amplifier 330 feeds in one direction or the other, in a way as a function of Δα, a current to winding 902 of diphased motor 901, the other winding 903 being fed by a suitable main power supply. Through these operations, the value and sign of Δα control the run of the motor. The motor may be utilized to position a suitable analog device whose position is to be controlled.

The reversing counter, as already mentioned, is adapted to receive speed indications. These indications are given by the computer in the form of a number $dα$ with its sign indicating by as many units angle α must vary during the cycle. The manner of computing the probable variation of $α_c$ during the next calculation cycle may vary with different applications. The probable variation of $dα$ is equal to $α_{c(n+1)}-α_{cn}$, the value $α_{c(n+1)}$ being obtained through interpolation from the preceding positions $α_{c(n-1)}, α_{c(n-2)} \ldots α_{c1}$ which are maintained in storage. Of course, it may not be desirable to go all the way back to $α_{c1}$ in computing $dα$. Alternatively, only a few immediately previous positions may be necessary for an accurate prediction of $α_{c(n+1)}$. In any event, the specific approach to interpolation could be determined by the person responsible for programming the computer. It should be understood that the entire operation of the computer, which may be of the general purpose stored program type, would be under the control of the programmer.

The value of $dα$ with its sign is transferred into a speed register shown in the lower part of FIG. 3a which is essentially comprised of triggers 401 through 407. This value and its sign are respectively delivered through line bundle 4010a and line 4010b and transferred into the triggers, previously reset, under the control of a negative transfer pulse in line 4011 which occurs at the same time as the value and sign of Δα are entered in the reversing counter.

The frequency generator is shown in the left part of FIG. 3a, and comprises an inverter 601 and binary input triggers 602 through 606. It is fed by recurrent pulses arriving in line 6010. Each trigger changes its state at the arrival of each negative pulse at the common input terminal thereto (terminal C in FIG. 5a), and each trigger is fed, by output terminal F (negative pulse for state 1 setting) in FIG. 5a of the preceding trigger, while capacitors 622 through 626 differentiate the pulses from outputs G of these triggers. Then are obtained in lines 6111 through 6116, and lines 6121 through 6126 which correspond to these triggers, negative pulses which flow in AND circuits 501 through 506 corresponding to those of triggers 401 through 406 which have been set into state 1 by the transfer of $dα$. There is provided an OR circuit 511 which directs into line 2112 a number of successive pulses during the cycle equal to the value of $dα$. As a matter of fact, assuming that in line 6010, thirty-two pulses are received during the cycle, due to the operation of the triggers, in lines 6121 through 6126 are found respectively thirty-two, sixteen, eight, four, two and one pulses. Since state 1 of triggers 401 through 406 represents the various digits in binary numeration of number $dα$, the digit of higher weight in trigger 401, the number of pulses delivered during the cycle into line 2112 represent the translation of the binary number of $dα$ from coded form into a number of pulses equal thereto. These pulses are transmitted from line 2112 to line 2411 in FIG. 3b by a circuit shown to be enclosed in a dotted block in FIG. 3b, the operation of which will now be described.

The dotted block just referred to is provided with reference numeral 120 and comprises a circuit which is capable of receiving input pulses from two separate sources and providing a number of output pulses equal to the number of input pulses received. This is true even though a pulse may arrive from each of the two sources at the same time, or at such close intervals as to make them indistinguishable by normal means. The circuit is comprised of a plurality of monostable circuits, inverters, and logical OR circuits which are combined in a fashion to accomplish the above described result.

A pulse arriving at the input to the monostable circuit 121 on line 2112 results in a twenty-four microseconds positive pulse being supplied to OR circuit 126. Assuming for the moment that the output from the left side of the monostable circuit 131 is in the form of a positive voltage to OR circuit 126, the output from the OR circuit will be a twenty-four microsecond positive pulse which, when inverted by inverter 123, will cause a twenty-four microsecond negative pulse to be supplied to the monostable circuit 122. The leading edge of the negative pulse supplied to monostable circuit 122 produces a positive pulse of fourteen microseconds duration from the right side of the circuit. This pulse is capacity coupled to inverter 251 in a fashion such that inverter 251 receives a positive pulse in coincidence with the leading edge of the positive pulse output from monostable circuit 122 and a negative pulse in coincidence with the trailing edge of the said positive pulse from the monstable circuit. The positive pulse input to inverter 251 produces a negative pulse input to OR circuit 138 which supplies negative pulse input to monostable circuit 241.

The monostable circuit 241 supplies a positive pulse of four microseconds duration to monostable circuit 242, the trailing edge of said positive pulse causing a negative pulse of four microseconds duration to be supplied over line 2018 to an inverter 243 and to AND circuit 260. The use of AND circuit 260 will be explained later in the description. The four microsecond negative pulse to inverter 243 results in a positive pulse of equal duration being supplied to trigger 201, the first stage of the counter previously described. The negative going trailing edge of the positive pulse input to trigger 201 causes the trigger to change state.

The polarity calculation circuit shown in the lower part of FIG. 3b directs into the counter information which determines whether pulses arriving in line 2114 should increase or decrease the value entered in this counter by the transfer of $\Delta\alpha$. A negative potential delivered by trigger 407 (sign of $d\alpha$) exists in line 7010 or 7011 according as $d\alpha$ is respectively positive or negative. On the other hand, a negative potential exists in one of lines 7012 or 7013 according as $\Delta\alpha$ is respectively positive or negative. AND circuit 701 is connected to lines 7010 and 7012 while AND circuit 702 is connected to lines 7011 and 7013. Through the action of AND circuit 701, there is a negative potential in line 7110 if $d\alpha$ and $\Delta\alpha$ are both positive while AND circuit 702 produces a negative potential in line 7111 if $d\alpha$ and $\Delta\alpha$ are both negative. However, lines 7110 and 7111 remain at the potential of the ground if $d\alpha$ and $\Delta\alpha$ have contrary signs. Thus, line 7113 is driven to a negative potential if $d\alpha$ and $\Delta\alpha$ have the same signs, and it is at ground potential if $d\alpha$ and $\Delta\alpha$ have contrary signs. On the other hand, every time inverter 251 delivers a pulse corresponding to one of the elements of $d\alpha$, trigger 721, which receives it through line 7210, switches to state 1, thus providing a negative voltage to AND circuit 722. The last-mentioned circuit produces a negative potential on line 7221, if $d\alpha$ and $\Delta\alpha$ have the same sign, which negative potential is transmitted to line 2015 through OR circuit 724 and AND circuit 731 since line 2017 normally is at a negative potential. If $d\alpha$ and $\Delta\alpha$ have contrary signs, the output of OR circuit 724 remains at ground potential and due to inverter 733 and circuit 732 produces a negative potential in line 2016.

In other words, if $d\alpha$ and $\Delta\alpha$ have the same sign, i.e., if pulses $d\alpha$ must increase the entered value (addition), a negative potential is obtained in line 2015, and if $d\alpha$ and $\Delta\alpha$ have contrary signs, i.e., if pulses $d\alpha$ must decrease the value entered in the counter (subtraction), a negative potential is obtained in line 2016. This counter, which may be termed a reversible binary counter, has the input pulses from line 2114 directed to the binary input terminal of smallest weight, trigger 201. If an addition is to be performed, a pulse must be directed into the trigger of the next stage, if the entered digit switches the trigger from 1 to 0, that is, if a negative potential develops at the right output terminal. For this purpose, AND circuits 211b, 212b, 213b . . . are unblocked by the presence of a negative potential in line 2015. On the other hand, in case of subtraction, the carry must be performed for the switching from 0 to 1 of the triggers, and subtraction line 2016 then, develops a negative potential for unblocking corresponding triggers 211a, 212a, 213a . . . . The delay which has been introduced by monostable circuit 241 enables to assure that the potential of addition or subtraction has been raised respectively in lines 2015 or 2016 before the arrival of pulses representing $d\alpha$ at the counter.

In order to avoid the production of carry during the time of the transfer of $\Delta\alpha$ into the counter at the same time as the transfer pulse is developed on line 2011, a positive pulse is directed into line 2017 (setting to ground potential) so as to inhibit AND circuits 731 and 732 and drive to ground potential both of lines 2015 and 2016, thus blocking the carry AND circuits 211a, 211b, 212a, 212b, 213a, 213b . . . .

The coder 1, which is adapted to be driven by the motor 9 by suitable shaft connection, may be utilized to identify the instantaneous position of the shaft. The shaft may in fact be the analog device to be positioned or it may control a device to be positioned.

During the rotation of the coder, every time angle $\alpha$ changes by one unit, a negative pulse is directed into line 8010 through the differentiation of the potential changes in line 1010 (smallest weight digit of the binary number representing angle $\alpha$) by capacitor 801 and resistors 802. This pulse is transmitted to line 2411 through the circuit shown in block 120 in FIG. 3b. As has been previously explained, this circuit is provided in order to ensure a sufficient time lag between pulses developed in line 2411 produced by pulses from lines 8010 and 2112, whatever the time when pulses arrive. Pulses from line 2411 then are transmitted to the counter in the same manner as the $d\alpha$ pulses from the speed register.

The operation of circuit 120 in producing a negative pulse at line 2411 in response to a negative pulse on line 8010 will now be explained. The negative pulse appearing on line 8010 is supplied to monostable circuits 131 and 111. The monostable circuit 131 supplies a sixteen microsecond negative output pulse to OR circuit 126 which, for its duration, blocks monostable circuit 121 from getting through the OR circuit in response to a negative pulse input on line 2112. Monostable circuit 111 supplies a four microsecond positive pulse from the right side thereof to a monostable circuit 112, the trailing edge of the positive pulse output from circuit 111 causing a twenty microsecond positive pulse from circuit 112. Assuming that OR circuit 116 is receiving a relatively positive voltage from the left side of monostable circuit 122, thereby indicating that a pulse has not recently been received on line 2112, the positive pulse output from monostable circuit 112 will produce a positive pulse input to inverter 252 in coincidence with the leading edge of the positive pulse output from monostable circuit 112 and a negative pulse in coincidence with the trailing edge of the positive pulse output from the circuit 112. Inverter 252, therefore, will supply a negative pulse output in coincidence with the positive pulse input thereto through OR circuit 138 to line 2411. At the same time the negative pulse from inverter 252 is utilized to switch the trigger 721 to its binary zero or OFF condition.

From the above, it will be seen that if a pulse is received by circuit 120 only on line 2112, a negative pulse appears on line 2411 immediately. If a pulse is received only on line 8010, a negative pulse appears on line 2411 four microseconds thereafter. The circuit is also arranged such that the pulse appearing first on one of lines 2112 or 8010 will produce pulses in the manner just described. However, the circuit is such that the second of pulse appears on the other line sooner than a predetermined. It is blocked from its ordinary production of a negative pulse on line 2411 until the first appearing pulse has completed a sequence. Thus, if a pulse appears first on line 8010, monostable circuit 131 supplies a sixteen microsecond negative pulse which blocks OR circuit 126. If a negative pulse appears on line 2112, during this sixteen microsecond pulse from monostable circuit 131, a positive pulse of twenty-four microseconds' duration is supplied from monostable circuit 121 to the OR circuit. As soon as the sixteen microsecond negative pulse from circuit 131 ends, a positive voltage is supplied from OR circuit 126 to inverter 123. The output from the inverter will be a negative going voltage which initiates a fourteen microsecond positive pulse from the right side of monostable circuit 122. Thus, under the above conditions, a negative pulse is produced on line 2411 as soon as the sixteen microsecond pulse from circuit 131 ends.

On the other hand, if a negative pulse appears first on line 2112, there immediately is produced a negative pulse of fourteen microseconds duration from the left side of the monostable circuit 122. This negative pulse is supplied to OR circuit 116 which already receives a negative voltage from the right side of monostable circuit 112. Thus, a negative voltage continues to be supplied from OR circuit 116. Due to the capacity coupling of the OR circuit to inverter 252, no pulse input is supplied to the inverter at this time. If now a pulse appears on line 8010, monostable circuit 111 supplies a positive pulse of four microseconds duration to the monostable circuit 112. The trailing edge of the four microsecond pulse initiates a twenty microsecond positive pulse from the right side of monostable circuit 112. Here again, the initiation of the positive pulse from monostable circuit 112 does not affect the output from OR circuit 116. However, as soon as the fourteen microsecond negative pulse from monostable circuit 122 terminates, a positive voltage is supplied from OR circuit 116, which results in a positive pulse being supplied to inverter 252. The output of the inverter will be a negative pulse which appears on line 2411 by way of OR circuit 138. Thus, under these conditions, a negative pulse is produced on line 2411 as soon as the fourteen microsecond pulse from monostable circuit 122 ends.

It also is necessary with respect to the coder output to send addition and subtraction indications through negative potentials in lines 2015 or 2016. If $\Delta\alpha$ is positive, angle $\alpha$ must increase due to the motor rotation, and corresponding check pulses in lead 2014 must decrease the value of $\Delta\alpha$. It is the same if $\Delta\alpha$ is negative and if motor rotation decreases angle $\alpha$. The coder used is a coder in which a known system for reading the two tracks of a smaller weight enables to remove the ambiguity due to mechanical imperfection in the tracks. This system also enables to determine the direction of rotation as can be seen in FIGS. 12a and 12b. In these figures, the tracks run past the read brushes in the direction of arrow d.

In FIG. 12a, the direction corresponds to an increase of angle $\alpha$. In this case, when brush c on the lowest order track passes from a shaded area to a light area, brush a on the next higher order track is in a light area while brush b is in a shaded area. Thus, the voltage on brushes a and b will be different. In FIG. 12b on the contrary, which corresponds to a decrease in angle $\alpha$, when brush c passes from a shaded area to a light area, brushes a and b will be at the same voltage. This characteristic is used in the circuit shown in the upper part of FIG. 3b for determining the direction of rotation of the coder.

It should be understood that each digit position in the track being read by brushes a and b represents a unit of rotation whereas each digit position in the lowest order track being read by brush c represents one-half unit of rotation. Therefore, by differentiating the pulses from the lowest order track by capacitor 801 and resistor 802, there will be produced a negative pulse for each unit of rotation.

The brushes a and b shown in FIGS. 12a and 12b are respectively connected to lines 8011a and 8011b. AND circuit 812 supplies a negative voltage to line 8110 through OR circuit 814 when both of lines 8011a and 8011b are at a negative voltage. A negative voltage is also produced on line 8110 when lines 8011a and 8011b are at ground potential. This is accomplished by OR circuit 811 and inverter 813. That is, since the input to the inverter will be at ground potential, the output from the inverter will be a negative voltage which will pass through OR circuit 814 to line 8110.

On the other hand, if one of the lines 8011a or 8011b is at a negative voltage and the other line is at ground, line 8110 will be at ground. This is due to the fact that a negative input will be supplied to inverter 813 whose output will be at ground.

From the above, it will be seen that line 8110 will be at a negative voltage when $\alpha$ is decreasing, as shown in FIG. 12b, and at ground when $\alpha$ is increasing, as shown in FIG. 12a.

Due to the presence of inverter 815, at the moment when a negative pulse arrives in line 8010, which is connected in parallel to one of the input terminals of each AND circuit 816 and 817, a negative potential is obtained in line 8151 for unblocking AND circuit 816 if lines 8011a and 8011b are not in the same state (increase of $\alpha$), and a negative potential is obtained in line 8152 for unblocking AND circuit 817 if lines 8011b are in the same state (decrease of $\alpha$). Therefore, trigger 821 is driven to state 0 so that line 8210 is at a negative potential if angle $\alpha$ increases, and it is set into state 1 so that line 8211 is at a negative potential if angle $\alpha$ decreases.

It will be appreciated that if the sign of $\Delta\alpha$ entered in the counter is positive and the coder is going in the direction of increasing angle $\alpha$, or if the sign of $\Delta\alpha$ entered in the counter is negative and the coder is going in the direction of decreasing angle $\alpha$, then the negative pulses developed on line 8010 from the coder, which eventually enter the counter by way of circuit 120, monostable circuits 241 and 242, and inverter 243, cause a subtraction in the counter. This is accomplished by virtue of the fact that AND circuits 703 and 704 are each blocked under these conditions, thus blocking AND circuit 707. Accordingly, the output of OR circuit 724 will be at ground. Inverter 733 supplies a negative voltage to AND circuit 732, which also receives a negative voltage on line 2017, thereby providing a negative voltage on the subtracting line 2016.

On the other hand, if angle $\alpha$ increases and $\Delta\alpha$ is negative, negative potentials in lines 8210 and 7013 develop a negative potential in lines 7311 and 7313 through the action of AND circuit 704 and OR circuit 706. Likewise, if angle $\alpha$ decreases and $\Delta\alpha$ is positive, negative potentials are obtained in lines 8211 and 7012 and subsequently in lines 7312 and 7313. These are cases where, in the counter, it is necessary to add to number $\Delta\alpha$ the pulses from the coder.

Trigger 721, having been set to a binary 0 state by the output from inverter 252 which resulted from the coder input pulse to circuit 120, supplies a negative voltage to AND circuit 707. Thus, the output from AND circuit 707, and thereby OR circuit 724 and AND circuit 731, causes a negative voltage on the addition line 2015 of the counter.

At the beginning of the cycle, such are the sign of $\Delta\alpha$ and the rotary direction of the coder, that pulses from the coder must be subtracted from $\Delta\alpha$ but subsequently to the delay of the motor in response to the control voltage, it may overshoot the defined correction. When the counter reaches value 0 all the triggers 201 through 208 are in state 0, and a negative potential exists in all the wires of bundle 2510. On the other hand, a negative potential exists in subtraction line 2016. When a positive pulse develops in line 2114 after the switching to zero of the counter, a negative pulse shows up in line 2018. This causes the development of a negative pulse at the binary input of sign trigger 209 through AND circuit 260 and this trigger switches its state, which, since the rotary direction of the coder has not changed, directs the negative potential of subtraction line 2016 into addition line 2015 for the pulses from the coder.

At the completion of each calculation cycle, a negative pulse is directed into lines 2019 and 4019. This pulse causes the reset of all the triggers of the reversing counter (201 through 209) and those of the speed register (401 through 407).

From the above detailed description it will be seen that there has been provided a new and improved control system for positioning a shaft or other suitable analog device. Provision is made such that the control of the analog device is continuous even though new information from the computer is available only at intervals. The arrangement is such that the counter or other suitable storage medium is varied during the calculation cycle in accordance with the trend in the desired positions for the analog device. That is, correction is made on a rather continuous basis over a calculation cycle in accordance with a probable desired rate of change for the analog device. Under these circumstances, the actual error in position of the analog device from a desired position will be kept very low. Furthermore, the polarity calculation circuit enables the modifying information supplied to the storage medium during a cycle to cause modification in the correct sense.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A control system for use in conjunction with a digital computer which receives information relative to the successive positions of an analog device whose position is to be controlled by said control system, said computer also receiving sufficient information to enable it to calculate successive desired positions for said analog device, said computer supplying at the end of each calculation cycle first and second data, said first data being indicative of the present position error of said analog device from a calculated desired position, said second data being indicative of the expected change from the present desired position to the next desired position; said control system comprising a storage device, means adapted to receive said first data and manifest a representation of said first data in said storage device, means responsive to the value of the representation in said storage device for positioning said analog device in accordance therewith, means connected to said analog device for producing signals representing unit changes in position of said analog device, the last-mentioned signals being supplied to said storage device for modifying the representation in said storage device as a function of change in unit position of said analog device, and means adapted to receive said second data and responsive thereto for further modifying said representation in said storage device at a substantially constant rate during each calculation cycle of said computer, said rate being a function of the value of said second data.

2. A control system for positioning an analog device in accordance with externally supplied information, said information comprising first and second data which are supplied in digital form at successive intervals of time, said first data representing the present position error of said analog device from a desired position, said second data being indicative of the expected change from the present desired position to the desired position after the next of said intervals of time, said control system comprising a storage media, means responsive to said first data for manifesting in said storage media a representation thereof, an analog device whose position is to be controlled, digital-to-analog conversion means connected to said storage media and responsive to the value manifested therein for positioning said analog device in accordance therewith, and means responsive to the change in position of said analog device and the value of said second data for incrementally modifying the representation manifested in said storage media in accordance therewith so as to cause said analog device to closely follow said desired positions.

3. A control system for positioning an analog device, said control system being adapted to supply signals representing the position of said analog device and to receive at successive times first and second data, said first data being indicative of the present position error of said analog device from a desired position, said second data being indicative of the probable change in desired position of said analog device until the next time said first and second data are received, a reversible counter connected to receive said first data for producing a count in said counter which is a function of said first data, means connected to said counter for converting the instantaneous count therein to a voltage proportional thereto, motive means connected to position said analog device in accordance with said voltage, position manifesting means connected to said analog device for supplying said signals representing the position thereof, pulse generating means connected to receive said second data for producing a number of pulses as a function of said second data, said pulses being distributed over the period between the times said first and second data are received, and means connected to receive the signals from said position manifesting means and the pulses from said pulse generating means for modifying the count in said counter so that the count therein closely approximates the position error of said analog device from a desired position.

4. A control system for positioning an analog device in accordance with externally supplied information, said information comprising first and second data which are supplied in digital form at successive intervals of time, said first data representing the present position error of said analog device from a desired position, said second data being indicative of the expected change from the present desired position to the desired position after the next of said intervals of time, said control system comprising a counter, control means connected to said counter and responsive to said first data for producing a count in said counter representative thereof, an analog device whose position is to be controlled, decoding means connected to said counter for producing a voltage which is a function of the count in the counter, motive means connected to said analog device and responsive to said voltage for positioning said analog device in accordance therewith, means connected to said analog device for producing pulses whose frequency is dependent on the rate of change in position of said analog device, pulse generating means adapted to receive said second data for producing a number of pulses spread over the next interval of time, said number of pulses being a function of the value of said second data, and means connected to receive said pulses whose frequency is dependent on the rate of change in position of said analog device and the pulses from said pulse generating means and modifying the count in said counter in a fashion such that the position of said analog device will approach the desired position.

5. A control system for positioning an analog device comprising a reversible counter, decoding means connected to said counter for producing a control voltage which is a function of the count in said counter, motive means connected to said analog device and governed by said control voltage for positioning said analog device in accordance therewith, coder means mounted on said analog device for supplying a signal in response to each unit of change in position of said analog device, first and second means adapted to periodically receive respectively first and second data, said first data representing the present position error of said analog device from a desired position, said second data representing the predicted variation between a present desired position and the next desired position, said first means being connected to said reversible counter for entering a count therein as a function of said first data, pulse generating means connected to said second means and controlled by said second data to produce a number of pulses proportional to said second data, said pulse generating means supplying said pulses substantially uniformly distributed over the time between the periodic receipt of said second data by said second means, and means connected to receive said pulses from said pulse generating means and the signals from said coder means and entering pulses in said counter so that the count in said counter closely approximates the position error of said analog device from a desired position.

6. A control system for positioning an analog device, said control system comprising a reversible counter, decoding means connected to said counter for producing a control voltage which is a function of the count in said counter, motive means connected to said analog device, said motive means being connected to receive said control voltage and to position said analog device in accordance therewith, coder means mounted on said analog device for producing present position signals representative of the instantaneous position of said analog device, computer means connected to said counter for periodically applying signals representative of the error in present position of said analog device as represented by said present position signals from a desired position determined within said computer means so as to produce a count in said counter which is a function of said error, register means, said computer means also periodically generating signals representative of the probable variation between the present desired position of said analog device and the desired position at the end of the next period and applying the last-mentioned signal to said register means, gate means for supplying a number of pulses to said counter during next period proportional to the signals in said register means, and means for supplying pulses to said counter for each position unit change of said analog device.

7. A control system for use in conjunction with a diigtal computer which receives information relative to the position of an analog device whose position is to be controlled by said control system as well as information relative to a desired position for said analog device, said computer suppling at the end of each calculation cycle thereof first data relating to the error in present position of said analog device from said desired position and second data relating to the difference between the present desired position and the probable desired position at the end of the next calculation cycle, said control system comprising a reversible counter adapted to receive said first data so as to have a count therein proportional to said first data, a decoder connected to said counter for supplying a control voltage which is a function of the count in said counter, an analog device which is to be positioned, motive means connected to said analog device and responsive to said control voltage for positioning said analog device in accordance therewith, coder means connected to said analog device for supplying data relative to the instantaneous position of said analog device, means connected to said coder means for supplying a pulse to said counter for each unit change of position of said analog device, and means responsive to said second data for supplying a number of pulses to said counter proportional to said second data, the last-named means distributing said pulses over the entire calculation cycle of said computer.

8. A control system for use in conjunction with a digital computer which receives information relative to the successive positions of an analog device whose position is to be controlled by said control system, said computer also receiving sufficient information to enable it to calculate successive desired positions for said analog device, said computer supplying at the end of each calculation cycle first and second data, said first data being indicative of the present position error of said analog device from a calculated desired position, said second data being indicative of the expected change from the present desired position to the next desired position; said control system comprising a storage device, means adapted to receive said first data and manifest a representation of said first data in said storage device, means responsive to the value of the representation in said storage device for positioning said analog device in accordance therewith, means connected to said analog device and said storage device for modifying the representation in said storage device as a function of change in unit position of said analog device, and means comprising a pulse generating circuit for generating a number of pulses spread over a calculation cycle, the number being determined by the said second data received at the beginning of a cycle, said pulses being supplied to said storage device for incrementally modifying the representation therein so that said analog device closely follows the desired position.

9. A control system for positioning an analog device in accordance with externally supplied signals relating to the desired position of said device, means connected to said analog device for producing present position signals, means responsive to said present position signals and the desired position signals for producing error signals, said control system comprising a storage media adapted to have manifested therein a numerical representation of said error signals representing the position error of said analog device, means connected to said storage media and responsive to the numerical representation therein for producing a change in position of said analog device as a function of said numerical value, signal generating means for producing expected rate of change signals, said rate of change signals being indicative of the rate of change in successive desired positions of said analog device, and means connected to receive at least a portion of said present position signals and said rate of change signals and incrementally modifying the numerical representation in said storage media in response thereto so as to cause said analog device to closely approximate said desired position.

10. A control system for positioning an analog device in accordance with externally supplied information relating to the desired position of said device, said analog device having coder means connected thereto for supplying signals representative of the actual position of said analog device, means responsive to said signals and said externally supplied information for producing first and second data at successive intervals, said first data being indicative of the error of said analog device from a desired position as defined by said external information, said second data being indicative of the expected change in desired position during a succeeding interval, a closed loop comprising a storage medium connected to receive said first data and have manifested therein a numerical representation of said first data, decoding means connected to said storage medium and said analog device for controlling the position of said analog device in accordance with said numerical representation, means responsive to the signals from said coder means for modifying the numerical representation in said storage medium as a function of the change in position of said analog device so as to complete said closed loop, and means connected to receive said second data and responsive thereto for further modifying said numerical representation in said storage medium in accordance with the expected change in desired position of said analog device.

11. A control system for positioning an analog device in accordance with externally supplied information relating to the desired position of said device, said analog device having coder means connected thereto for supplying signals representative of the actual position of said analog device, means responsive to said signals and said externally supplied information for producing first and second data at successive intervals, said first data being indicative of the error of said analog device from a desired position as defined by said external information, said second data being indicative of the expected change in desired position during a succeeding interval, a closed loop comprising a storage medium connected to receive said first data and have manifested therein a numerical representation of said first data, decoding means connected to said storage medium and said analog device for controlling the position of said analog device in accordance with said numerical representation, means responsive to the signals from said coder means for modifying the numerical representation in said storage medium as a function of the change in position of said analog device so as to complete said closed loop, and pulse generating means responsive to said second data for generating a plurality of pulses proportional thereto which are distributed over the interval immediately following receipt of said second data, which pulses are supplied to said storage media for modifying the numerical representation therein as a function of the expected rate of change of said desired position of said analog device over said interval.

12. A control system for positioning an analog device in accordance with externally supplied information relating to the desired position of said device, said analog device having coder means connected thereto for supplying signals representative of the actual position of said analog device, means responsive to said signals and said externally supplied information for producing first and second data at successive intervals, said first data being indicative of the error of said analog device from a desired position as defined by said external information, said second data being indicative of the expected change in desired position during a succeeding interval, a closed loop comprising a storage medium connected to receive said first data and have manifested therein a numerical representation of said first data, decoding means connected to said storage medium and said analog device for controlling the position of said analog device in accordance with said numerical representation, means responsive to the signals from said coder means for modifying the numerical representation in said storage medium as a function of the change in position of said analog device so as to complete said closed loop, and pulse generating means responsive to said second data for generating a plurality of pulses proportional to said second data, said pulses being distributed over the interval immediately following receipt of said second data, and means connected to receive said pulses and supplying them to said storage media in a fashion to increase the numerical representation in said storage media if the sign of said numerical representation is the same as the sign of said second data and to decrease said numerical representation if the signs are different.

13. A control system for positioning an analog device in accordance with externally supplied information relating to the desired position of said device, said analog device having coder means connected thereto for supplying signals representative of the actual position of said analog device, means responsive to said signals and said externally supplied information for producing first and second data at successive intervals, said first data being indicative of the error of said analog device from a desired position as defined by said external information, said second data being indicative of the expected change in desired position during a succeeding interval, a storage medium connected to receive said first data and have manifested therein a numerical representation of said first data, decoding means connected to said storage medium and said analog device for controlling the position of said analog device in accordance with said numerical representation, first pulse generating means responsive to the signals from said coder means for producing pulses representative of unit changes in position of said analog device, second pulse generating means responsive to said second data for generating a plurality of pulses distributed over the interval following receipt of said second data, and means connected to said storage media responsive to the pulses from said first and second pulse generating means for modifying the numerical representation therein in accordance therewith so that the numerical representation is representative of the actual error in position of said analog device at the time said first data are received and representative of the probable error during the intervals between the times said first data are received.

14. A control system for positioning an analog device in accordance with externally supplied information relating to the desired position of said device, said analog device having coder means connected thereto for supplying signals representative of the actual position of said analog device, means responsive to said signals and said externally supplied information for producing first and second data at successive intervals, said first data being indicative of the error of said analog device from a desired position as defined by said external information, said second data being indicative of the expected change in desired position during a succeeding interval, a storage medium connected to receive said first data and have manifested therein a numerical representation of said first data, decoding means connected to said storage medium and said analog device for controlling the position of said analog device in accordance with said numerical representation, first pulse generating means responsive to the signals from said coder means for producing pulses representative of unit changes in position of said analog device, second pulse generating means responsive to said second data for generating a plurality of pulses distributed over the interval following receipt of said second data, a polarity calculation circuit responsive to the sign of the signals from said coder means, the sign of the numerical representation in said storage medium and the sign of said second data for controlling the application of the pulses from said first and second pulse generating means to said storage medium to modify the numerical representation in said storage medium in accordance therewith so that the numerical representation is representative of the actual error in position of said analog device at the time said first data are received and representative of the probable error during the intervals between the times said first data are received.

References Cited by the Examiner

UNITED STATES PATENTS 2,729,773   1/56   Steele ------------------ 318—28
2,775,727  12/56   Kernaham et al. -------- 318—28

JOHN F. COUCH, *Primary Examiner.*

NORMAN H. EVANS, *Examiner.*